United States Patent

Staar

[15] 3,677,396

[45] July 18, 1972

[54] STORAGE BOX FOR TAPE-CONTAINING CASSETTES AND THE LIKE

[72] Inventor: Theophiel Clement Josef Lodewijk Staar, Kraainem, Belgium

[73] Assignee: Staar, S.A., Brussels, Belgium

[22] Filed: Oct. 30, 1970

[21] Appl. No.: 85,430

[30] Foreign Application Priority Data

March 16, 1970 Belgium ........747,431

[52] U.S. Cl. ........206/1 R, 206/1.5, 206/65 R, 206/DIG. 36, 221/87, 312/246

[51] Int. Cl. ........B65d 39/00

[58] Field of Search ........206/1 R, 1.5, 59 E, 65 R; 312/246, 333, 348; 220/20; 221/87

[56] References Cited

UNITED STATES PATENTS

| | | | |
|---|---|---|---|
| 3,603,478 | 9/1971 | Connan | 221/87 |
| 3,385,643 | 5/1968 | Adell | 206/1 R UX |
| 3,510,008 | 5/1970 | Mason | 206/1 R UX |
| 2,199,898 | 5/1940 | Visser | 312/246 |
| 2,553,138 | 5/1951 | Hendricks | 312/246 |

*Primary Examiner*—Joseph R. Leclair
*Assistant Examiner*—Steven E. Lipman
*Attorney*—Wolfe, Hubbard, Leydig, Voit & Osann

[57] ABSTRACT

A storage facility or box for storing sound tape cassettes having projecting finger elements which positively retain each cassette within a compartment when the cassette is inserted. Projecting finger elements also immobilize the cassette tape reel hubs and cassette pressure pads to prevent tape unwinding and cassette rattling.

13 Claims, 7 Drawing Figures

INVENTOR
THEOPHIEL CLEMENT JOZEF LODEWIJK STAAR
by: Wolfe, Hubbard, Leydig, Voit & Osann
ATTYS.

INVENTOR
THEOPHIEL CLEMENT JOZEF LODEWIJK STAAR by: Wolfe, Hubbard, Leydig, Voit + Osann
ATTYS.

INVENTOR
THEOPHIEL CLEMENT JOZEF LODEWIJK STAAR by: Wolfe, Hubbard, Leydig, Voit & Osann
ATTYS.

STORAGE BOX FOR TAPE-CONTAINING CASSETTES AND THE LIKE

This invention relates generally to storage boxes or storage facilities, and more particularly concerns a storage box for sound tape containing cassettes wherein a cassette inserted into the storage box is positively locked therein, and wherein cassette parts may be rendered immovable so as to prevent rotation, vibration, and rattling.

Sound tape transports for tape cassettes have found increasing acceptance recently, especially in automobile and other vehicle installations. With the increased demand for such tape playback installations, a corresponding demand has arisen for a device or facility wherein a number of tape cassettes may be stored.

Theprincipal object of the invention is to provide a storage box for a plurality of tape cassettes which will afford a tape system user convenient access to a selection of pre-recorded music.

Numerous problems have been faced in the development of such a tape cassette storage facility. For example, the storage facility must be constructed so that the cassettes can be readily introduced and removed. This is especially true in storage facilities for use in automobiles, since it is anticipated that a vehicle driver may wish to remove a cassette from the storage facility, or insert a cassette while he is in the act of driving the vehicle. Naturally, the demands of safety require that the driver's attention be minimally distracted when handling the cassette in removing it from or in returning it to the storage facility.

As a second example, it is desirable that the tape-containing cassettes be retained within the storage box or facility so they do not rattle or vibrate within their storage compartments. Again, such requirement is especially important when the storage box is carried in a vehicle. When the storage facility is so used, such rattle or vibration induced by the vehicle motion can prove distracting or irritating to the vehicle occupants.

As a third example, it is desirable that the internal parts of the tape cassettes themselves be locked against or prohibited from moving, so as to eliminate another source of rattle. Further, if the tape-holding reels located within the cassette are allowed to rotate while the cassette is stored, tape unwinding and consequent snarling can occur.

As a fourth example, it is desirable that the tape cassettes, to the touch of a person inserting or extracting a cassette, feel securely locked in the storage facility. If cassettes are received and held within such a facility so that they are not secured to the touch, the user or prospective buyer of such a storage box facility may decide, even unconsciously, that the storage facility is flimsy, "cheap," or unreliable.

It is accordingly an object of this invention to provide a storage facility or retaining box for sound tape cassettes which allows cassettes to be easily and quickly inserted or removed.

It is another object to provide a storage facility for tape cassettes and the like which positively and securely retains the cassettes.

It is an allied object to provide a storage facility for tape cassettes and the like which will positively secure cassette parts, such as tape storage reels and pressure pads, in a locked or immobile position within the stored cassette, thereby preventing rattle when the storage box and contained cassettes are subject to vibration.

Another object of the invention is to provide a storage facility for tape cassettes and the like which will provide a solid and positive "feel" to the user of the storage facility when the tape cassette is inserted or removed.

Still another object is to provide a tape cassette storage facility or box which can be easily adapted to inexpensive high-volume production methods.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Figures 1, 2, 3:
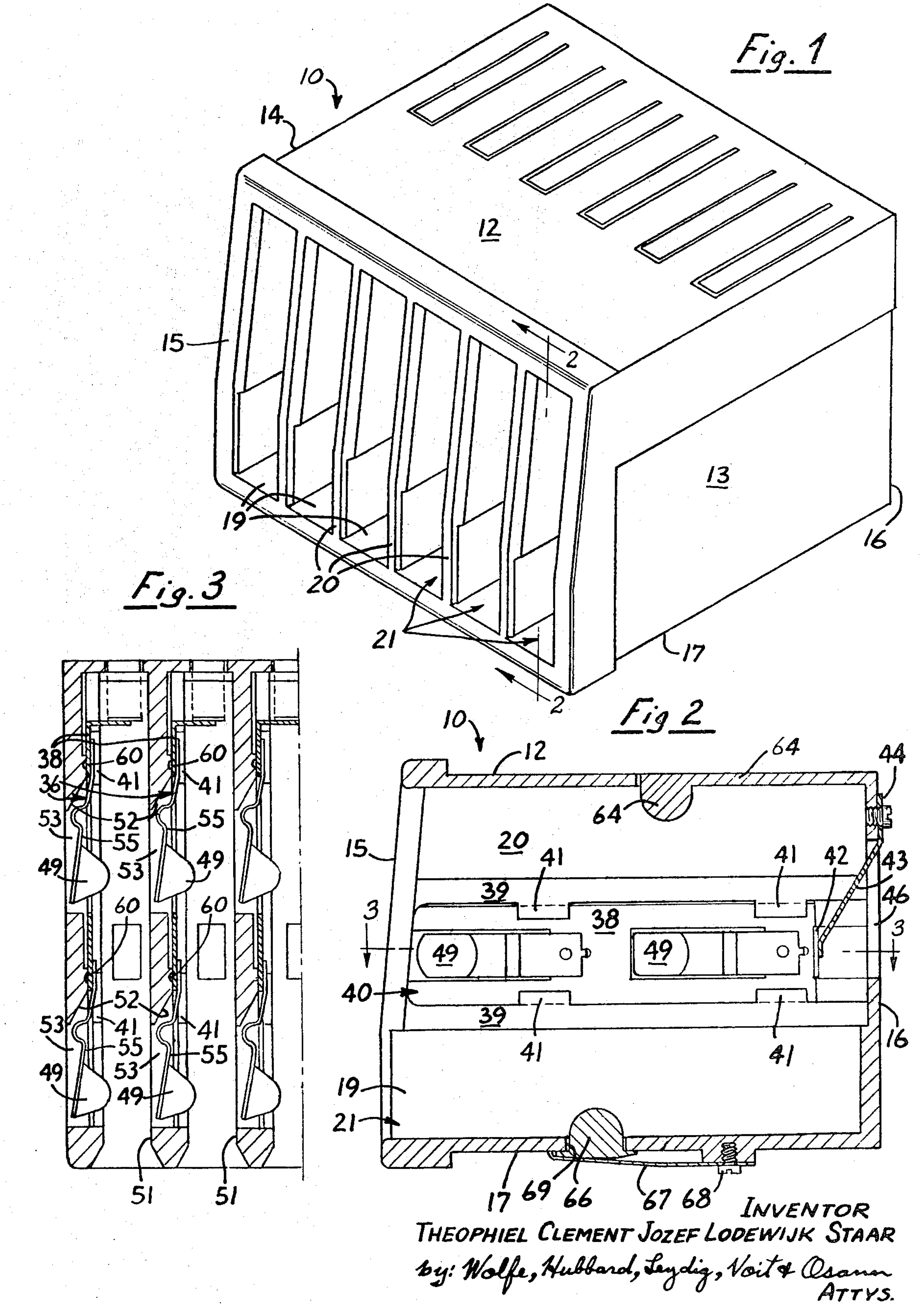
FIG. 1 is an overall perspective view of a tape cassette storage box embodying the invention.
FIG. 2 is a vertical sectional view taken substantially along line 2—2 in FIG. 1 showing the interior of a typical storage compartment.
FIG. 3 is a horizontal sectional view taken substantially along line 3—3 in FIG. 2 showing several storage compartments and the cassette locking means associated therewith.

Turning first to FIGS. 1 and 2, there is shown a cassette storage box or facility 10, defined by a top 12, sides 13 and 14, front 15, rear 16, and bottom 17. Inside the box 10, a plurality of compartments 19 are defined by substantially identical parallel side walls 20. Each of the compartments 19 is provided with a front opening 21 through which tape cassettes 22 (see FIGS. 4 and 5) may be inserted and removed.

The storage box 10 is adapted to store cassettes 22 of the type having, in both faces 25, apertures 27 which provide access to the hubs 28 of tape reels 29 mounted within the cassette 22. Located in one edge 31 of the cassette 22 is an aperture 32 providing access to a sound tape 33 and tape pressure pad 34 positioned behind the tape.

In accordance with the invention, a cassette 22, the tape reels 29 and other movable elements contained therein are locked or immobilized when the cassette 22 is inserted in the storage box. To this end, reel locking members 36 are caused to penetrate the reel hubs as a cassette is pushed into any one of the storage compartments, and the cassette and its movable elements are released when the cassette is removed. For actuating the tape reel locking members 36, a slide plate 38 is mounted for sliding motion upon one side wall 20 of each compartment 19, as shown in FIGS. 2, 3, 6 and 7. To hold the slide plate, the side wall 20 is formed with raised bars 39 extending the full depth of each compartment providing a slide track 40, and with lugs 41 extending from the bars 39 over the opposite edges of the plate 38 leaving slots under the lugs in which the slide plate is free to move between the front 15 and the rear 16 of the storage box 10.

It is a feature of the invention that a cassette 22, when inserted into a compartment, will force the slide plate 38 toward the compartment rear 16 and, as an incident to such movement, the locking members 36 will be actuated to engage the cassette. For accomplishing this, the end 42 of each plate 38 is turned inward and projects into the adjacent compartment 19 for engagement by the end of the cassette 22 as the cassette is inserted into the compartment 19. (See FIGS. 6 and 7). The slide plate 38 is normally urged forward by a biasing member 43, which is mounted in each compartment to engage the slide plate 38 and oppose its inward movement by the cassette. As herein shown, each biasing member 43 takes the form of a spring having one end 44 secured to the rear 16 of the storage box 10 and an opposite free end for contacting the inwardly projecting end 42 of the slide plate. An aperture 46 is formed in the box rear 16, so that the spring end 44 may be secured to the outside of the box 10, while the main portion of the spring 43 projects through the aperture inside a compartment of the box assembly.

In keeping with the invention, fingers 49 carried by the hub locking members 36 are cammed to penetrate the hollow centers 50 of the cassette reel hubs, as an incident to insertion of a cassette into a compartment. The thrusting penetrating action of the fingers 49 into the hub centers 50 also serves to force the cassette 22 itself into a secure, rattle-free position against the opposite side 51 of the compartment 19. To achieve this, the hub locking members 36 are urged toward the cassette 22 by the camming action of inclined surfaces 52 formed upon recessed portions 53 of the compartment walls 20 as the slide plate 38 is moved by the cassette 22 toward the box rear 16.

The illustrated locking members 36 include resilient spring members 55 mounted, at one end, upon the slide plate 38; at the free ends of the spring member, the fingers 49 are mounted. These fingers 49 may be made of relatively soft rubber or the like, or may be made of a hard material. The resilient spring members 55 are attached to the slide plate 38 so as to project through apertures 57 formed therein. Recesses 53 formed in the compartment walls 20 are located for registration with the hub locking members 36 when the slide plate 38 is located in a forward position, thereby providing a clearance allowing the resilient spring members 55 to urge the fingers 49 out of engagement with the cassette reel hub 28.

Pursuant to the invention, provision is also made for retaining the hub locking members 36 in their hub-engaging positions, and for holding the slide plate 38 in its rearmost location. This is accomplished by locating projections 59 upon the spring members 55. These projections 59 engage corresponding locking recesses 60 upon the compartment walls 20, thereby retaining the hub locking members 36 in the hubs 28 and preventing the spring 43 from forcing the slide plate 38 forward.

Figure 4:
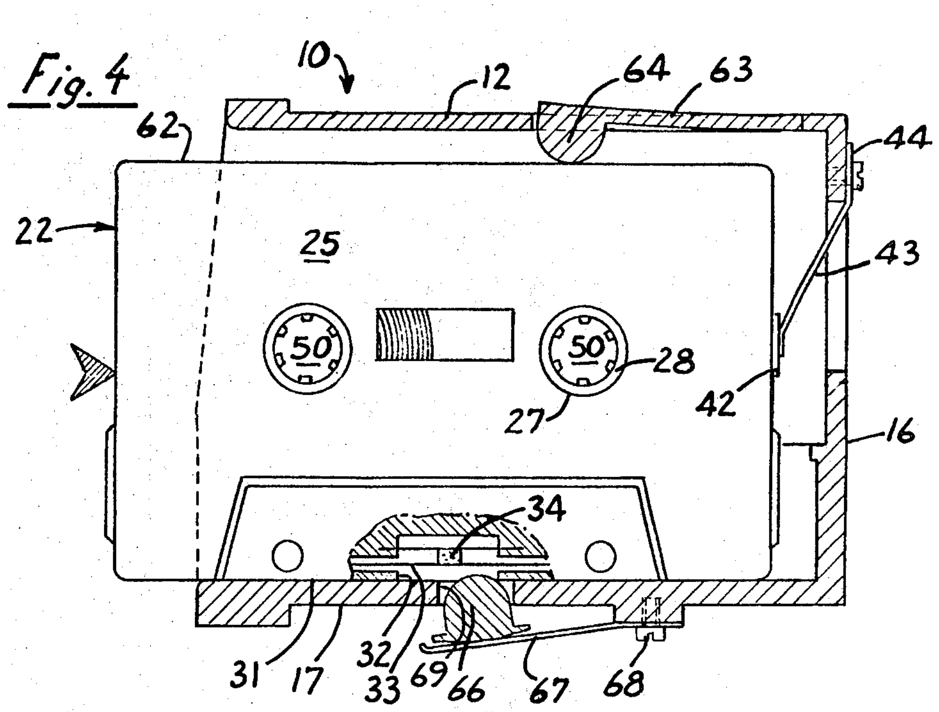
FIG. 4 is a vertical sectional view taken substantially along line 2—2 in FIG. 1 and showing the operation of various parts of the illustrated embodiment of the invention as a cassette is inserted into a storage compartment.
Figure 5:
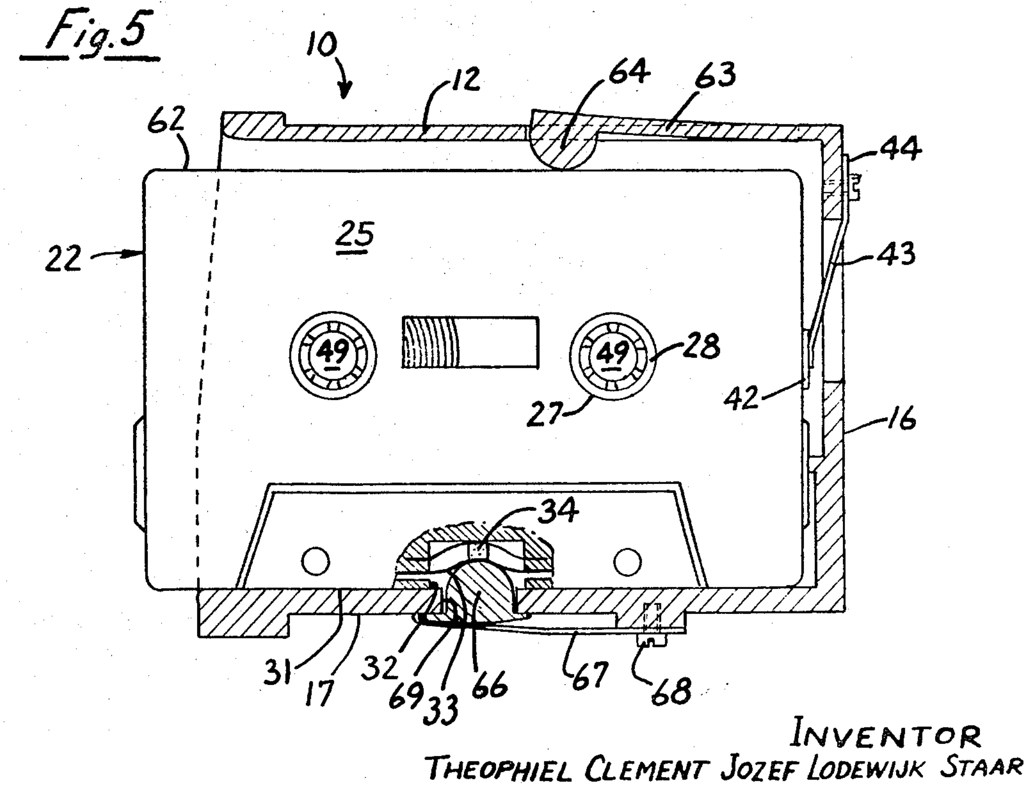
FIG. 5 is a vertical sectional view similar to FIG. 4 taken substantially along line 2—2 in FIG. 1 showing the position of the parts when a cassette has been fully inserted into a compartment.
Figure 6:
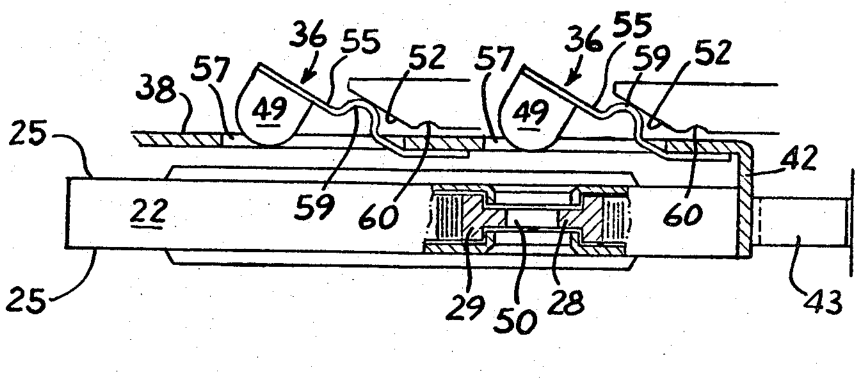
FIG. 6 is an enlarged fragmentary view partly in section, showing diagrammatically the operation of the cassettes reel hub locking elements.
Figure 7:
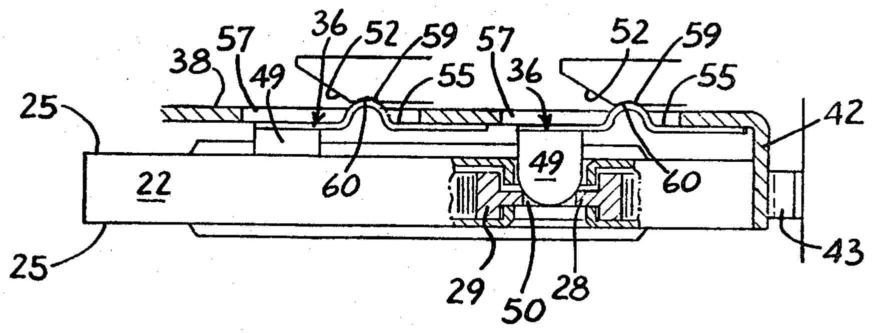
FIG. 7 is an enlarged fragmentary view partly in section and similar to FIG. 6 showing diagrammatically the position of the hub locking elements when a cassette is fully inserted into the storage facility.

In accordance with a further aspect of the invention, provision is made for engaging the top 62 of a cassette 22 as it is being inserted in a compartment so as to positively hold the cassette within the enclosing compartment 19 and to prevent rattling of the cassette therein. To accomplish this in the present illustration of the invention where the box is made of a resilient plastic material or the like, the top of each compartment 19 is slit to provide a resilient movable arm 63 carrying a rounded end 64 which engages the cassette as it is being inserted, and urges the cassette downwardly toward the compartment bottom as seen in FIGS. 4 and 5.

Provision is also made, in accordance with the invention, for engaging the recording head tape contact aperture 32 and pressure pad 34 to eliminate yet another source of movement and rattle. A bottom projecting member 66, resiliently mounted at the storage box bottom 17, urges the tape pressure pad 34 toward the compartment top 12. It is a feature of the invention that this bottom projecting member 66 is mounted upon a resilient strip 67 secured by appropriate means 68 to the outside of the storage box, and projects into the compartment bottom 17 through an opening 69 therein, thereby facilitating assembly of the finished storage box.

Cassettes 22 may thus be easily inserted into the box compartment, and the reels and pressure pads retained against motion and rattling. The cassettes 22 themselves, being resiliently forced against one side and the bottom of a compartment 19, are prevented from rattling therein when the box 10 is subjected to motion. Moreover, the cassettes 22 are positively locked within the box, and remain so secured until their release is desired. Thereupon, a pull upon a selected cassette will actively and easily present it for use, and the movable storage box elements are returned to their original position.

I claim as my invention:

1. A storage box for cassettes containing sound-recording tapes and the like, the cassettes being of the type having, in a wall thereof, apertures providing access to the hubs of tape reels, and having, in an edge thereof, an aperture providing access to a tape pressure pad, the storage box providing at least one compartment and comprising the combination of a plate slidably mounted for forward and rearward movement upon one wall of said compartment, said plate being engageable and movable rearwardly by a cassette inserted into the compartment, locking members movably carried upon the plate for movement into and out of the reel hubs of a cassette engaging said plate and fixed cam means on said one wall of said compartment cooperating with said locking members upon rearward movement of said plate to cam said locking members into the cassette reel hubs so as to lock the same against rotation.

2. A storage box for cassettes containing sound-recording tapes and the like, the cassettes being of the type having, in a wall thereof, apertures providing access to the hubs of tape reels, and having, in an edge thereof, an aperture providing access to a tape pressure pad, the storage box providing at least one compartment and comprising the combination of a plate slidably mounted for forward and rearward movement upon one wall of said compartment, said plate being engageable and movable rearward by a cassette inserted into the compartment, locking members movably carried upon the plate opposite the reel hubs of a cassette engaging said plate, and fixed means formed on the compartment wall for penetrating the locking members into the cassette reel hubs as the plate and cassette are moved toward the rear of the compartment.

3. A storage box according to claim 2, including locking means for retaining the locking members in the cassette tape reel hubs when said plate and cassette have been moved rearward in the compartment.

4. A storage box according to claim 2, including a foot formed at the rear end of the slide and projecting into the compartment for engaging the cassette as the cassette is moved rearward in the compartment.

5. A storage box according to claim 2, including a biasing member for urging said plate forwardly in the compartment.

6. A storage box according to claim 2 wherein said locking members include resilient spring members mounted, at one end thereof, upon said slide plate and having a projecting portion intermediate the ends thereof for engaging corresponding locking recesses upon the compartment walls, and resilient bulbous fingers for engaging the cassette reel hubs mounted upon the free ends of the resilient spring members.

7. A storage box according to claim 6, wherein said locking members are positioned upon said plate for projection through apertures formed in the slide plate, and wherein the walls of said compartment are formed with recessed portions for registration with the hub locking members when the slide plate is located at a forward position, thereby allowing the resilient spring members to urge the bulbous fingers out of engagement with the cassette tape reel hubs.

8. A storage box according to claim 7, wherein said locking members are urged toward the cassette as the cassette is inserted into the storage box by the camming action of inclined surfaces formed upon said recessed portions of said compartment walls as said slide plate moves rearward in the compartment.

9. A storage box according to claim 2, including a top projecting member resiliently mounted at the top of the compartment for urging an inserted cassette toward the compartment bottom.

10. A storage box according to claim 9, wherein said top projecting member mounted at the compartment top is mounted upon a resilient strip formed from the top of said storage box.

11. A storage box according to claim 2, including a bottom projecting member resiliently mounted at the storage box bottom for urging the pressure pad of an inserted cassette toward the compartment top.

12. A device according to claim 11, wherein said bottom projecting member is resiliently inserted into a recording head tape contact aperture formed in the cassette when the cassette is inserted into the storage box.

13. A device according to claim 12, wherein said bottom projecting member projects through an opening in the bottom of the compartment and is urged upwardly into the compartment by means of a resilient strip secured to the outside of said storage box.

* * * * *